(12) United States Patent
Wen et al.

(10) Patent No.: US 10,446,073 B2
(45) Date of Patent: Oct. 15, 2019

(54) DRIVING METHOD FOR DISPLAY PANEL

(71) Applicant: AU Optronics Corporation, Hsin-Chu (TW)

(72) Inventors: Chun-Kuei Wen, Hsin-Chu (TW); Chun-Yu Chen, Hsin-Chu (TW); Yi-Hao Wang, Hsin-Chu (TW); Jie-Chuan Huang, Hsin-Chu (TW); Hung-Min Shih, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/787,995

(22) Filed: Oct. 19, 2017

(65) Prior Publication Data

US 2018/0315368 A1   Nov. 1, 2018

(30) Foreign Application Priority Data

Apr. 28, 2017  (TW) .............................. 106114192 A

(51) Int. Cl.
*G09G 3/20* (2006.01)
*G06F 3/041* (2006.01)
*G09G 3/36* (2006.01)

(52) U.S. Cl.
CPC ......... *G09G 3/2092* (2013.01); *G06F 3/0412* (2013.01); *G06F 3/0418* (2013.01); *G09G 3/3611* (2013.01); *G09G 3/3614* (2013.01); *G09G 3/3685* (2013.01); *G09G 2300/0426* (2013.01); *G09G 2300/0452* (2013.01); *G09G 2310/0243* (2013.01); *G09G 2310/0281* (2013.01); *G09G 2310/0297* (2013.01); *G09G 2310/08* (2013.01); *G09G 2354/00* (2013.01)

(58) Field of Classification Search
CPC ......... G09G 2300/0297; G09G 3/3614; G09G 2310/0297
See application file for complete search history.

(56) References Cited

U.S. PATENT DOCUMENTS

| | | | |
|---|---|---|---|
| 6,448,836 B2 | 9/2002 | Kokubun et al. | |
| 9,449,567 B2 | 9/2016 | Chen et al. | |
| 2008/0136756 A1* | 6/2008 | Yeo ...................... | G09G 3/3677 345/87 |
| 2011/0025678 A1* | 2/2011 | Chung ................. | G09G 3/3233 345/213 |
| 2011/0187633 A1 | 8/2011 | Huang et al. | |
| 2013/0215053 A1 | 8/2013 | Lin et al. | |
| 2014/0191931 A1* | 7/2014 | Kim ...................... | G09G 3/3291 345/76 |
| 2016/0078826 A1* | 3/2016 | Yoo ....................... | G09G 3/3688 345/691 |
| 2017/0323606 A1* | 11/2017 | Wang ................... | G09G 3/3607 |
| 2018/0068615 A1* | 3/2018 | Imai ..................... | G09G 3/3225 |

FOREIGN PATENT DOCUMENTS

TW          201335820          9/2013

OTHER PUBLICATIONS

Taiwan Intellectual Property Office, "Office Action" dated Oct. 6, 2017, Taiwan.

* cited by examiner

*Primary Examiner* — Sanjiv D. Patel
(74) *Attorney, Agent, or Firm* — WPAT, PC

(57) ABSTRACT

A driving method for a display panel is provided, including the following steps: providing a first control signal, and providing a second control signal, where a voltage change of the second control signal compensates for a voltage change of the first control signal.

17 Claims, 10 Drawing Sheets

DRIVING METHOD FOR DISPLAY PANEL

BACKGROUND

Technical Field

The present invention relates to a driving method for a display panel, and in particular, to a driving method for a multiplexing-driven display panel.

Related Art

Display panels are widely applied to various consumer electronic products such as computer screens, mobile phones, and televisions. In recent years, a touch function has been integrated into display panels. A user may perform touch operations, such as tapping, moving, and drawing, on a panel directly by using a finger or a stylus. However, during a process of driving pixel data, a display panel may generate excess noise, affecting the touch function. Therefore, providing a driving method that can reduce panel noise is one of the subjects to which persons skilled in the art are dedicated.

SUMMARY

The present invention relates to a driving method for a display panel, which can effectively reduce panel noise.

According to a first aspect of the present invention, a driving method for a display panel is provided, including the following steps: providing a first control signal, and providing a second control signal, where a voltage change of the second control signal compensates for a voltage change of the first control signal.

To make the foregoing aspect and other aspects of the present invention more comprehensible, embodiments are described below in detail with reference to the accompanying drawings.

DETAILED DESCRIPTION

Figure 1:
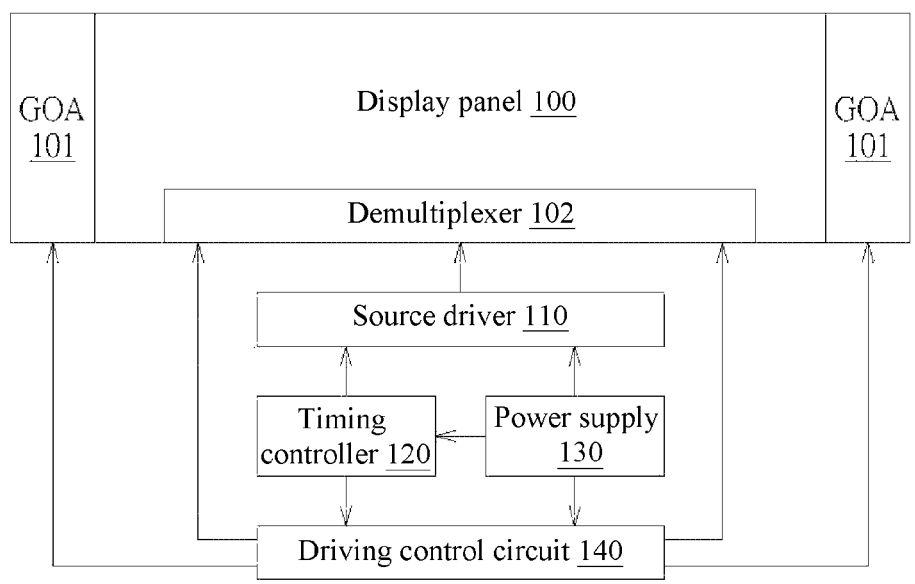
FIG. 1 is a schematic diagram of a display panel and a driving circuit according to an embodiment of the present invention.

FIG. 1 is a schematic diagram of a display panel and a driving circuit according to an embodiment of the present invention. A display panel 100 may include a plurality of pixels. Each pixel, for example, may include a red subpixel, a green subpixel, and a blue subpixel, and is used to display image data. The display panel 100 may include a gate on array (GOA) 101. That is, a gate driving circuit is directly manufactured on an array substrate, so as to provide a gate driving signal.

A source driver 110 is configured to provide pixel data displayed on the display panel 100. The display panel 100 includes a demultiplexer 102, which may be configured to selectively provide the data from the source driver 110 to one of data lines of the display panel 100. For example, the demultiplexer 102 may selectively provide a data driving signal from the source driver 110 according to a demultiplexing control signal to a first data line or a second data line of the display panel. A driving control circuit 140 is configured to provide control signals of the GOA 101 and the demultiplexer 102. A timing controller (TCON) 120 is configured to provide a synchronization control signal to the source driver 110 and the driving control circuit 140. Operating voltages of the source driver 110, the timing controller 120, and the driving control circuit 140 may be provided by a power supply 130.

Figure 2A:
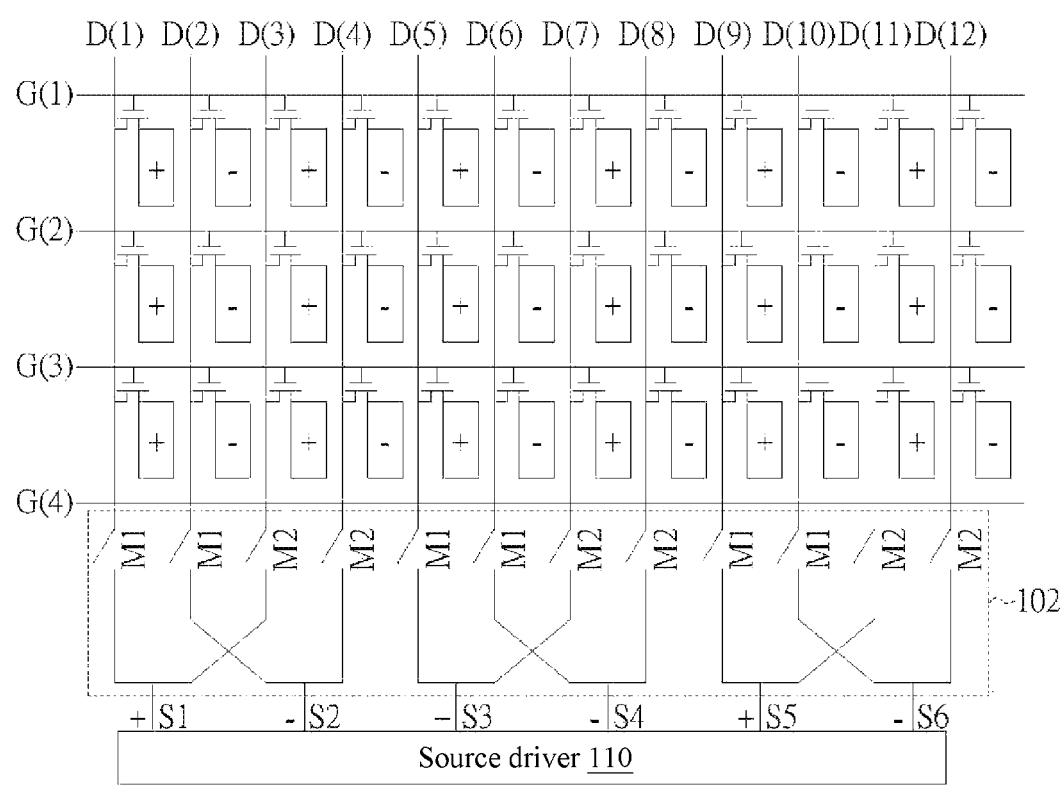
FIG. 2A is a schematic diagram of a display panel and a demultiplexer in an example.

FIG. 2A is a schematic diagram of a display panel and a demultiplexer in an example.

Cross reference may be made to the display panel 100, the demultiplexer 102, and the source driver 110 in FIG. 1. The demultiplexer 102 includes a plurality of switch elements, for example, may be implemented as thin film transistors (TFTs) in the panel. As shown in FIG. 2A, the demultiplexer 102 receives a first control signal M1 and a second control signal M2, and selectively provides a data driving signal S1 provided by the source driver 110 to a data line D(1) or a data line D(3). Similarly, the demultiplexer 102 receives the first control signal M1 and the second control signal M2, and selectively provides a data driving signal S2 provided by the source driver 110 to a data line D(2) or a data line D(4). The example illustrates a 1-to-2 demultiplexer 102. By using the demultiplexer 102, a quantity of devices connected between the source driver 110 and the display panel 100 can be reduced. In this example, data lines D(1), D(4), D(7), and D(10), for example, correspond to red sub-pixels, data lines D(2), D(5), D(8), and D(11), for example, correspond to green sub-pixels, and data lines D(3), D(6), D(9), and D(12), for example, correspond to blue sub-pixels. Gate driving signals G(1) to G(4) are used to enable each row (row) of pixels in order, to write data in the data lines D(1) to D(12) into the pixels.

Figure 2B:
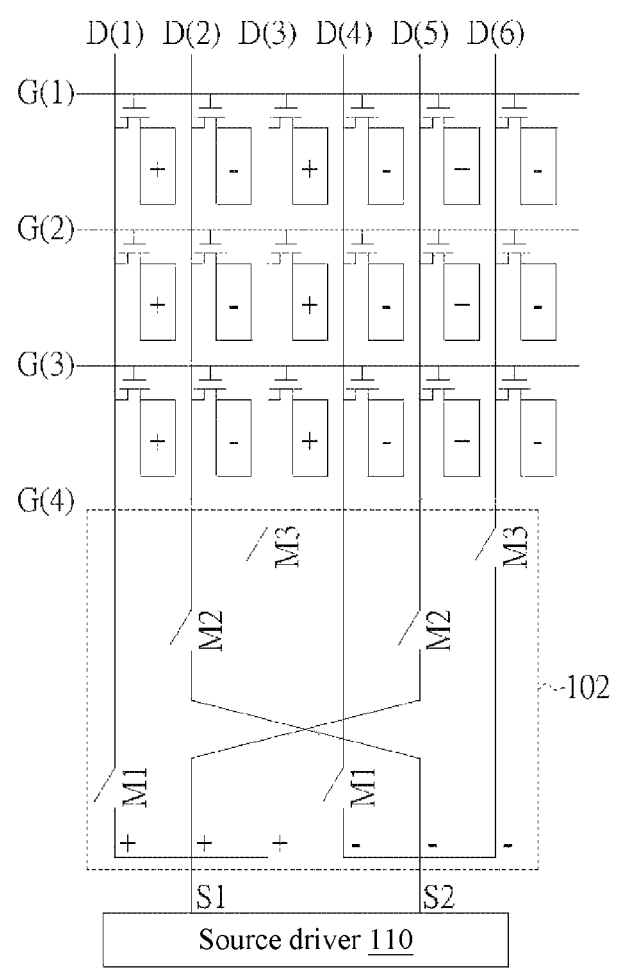
FIG. 2B is a schematic diagram of a display panel and a demultiplexer in another example.

FIG. 2B is a schematic diagram of a display panel and a demultiplexer in another embodiment. FIG. 2B illustrates a 1-to-3 demultiplexer 102 in an example. The demultiplexer 102 receives a first control signal M1, a second control signal M2, and a third control signal M3, and selectively provides a data driving signal S1 provided by the source driver 110 to one of the data line D(1), D(3), and D(5). Similarly, the demultiplexer 102 receives the first control signal M1, the second control signal M2, and the third control signal M3, and selectively provides a data driving signal S2 provided by the source driver 110 to one of the data line D(2), D(4), and D(6). In this example, the data lines D(1) and D(4), for example, correspond to red sub-pixels, the data lines D(2) and D(5), for example, correspond to green sub-pixels, and the data lines D(3) and D(6), for example, correspond to blue sub-pixels.

In the examples shown in FIG. 2A and FIG. 2B, the gate driving signals G(1) to G(4) are enabled in order; and the first control signal M1 and the second control signal M2 (and the third control signal M3) are alternately enabled. Therefore, during driving the display panel 100, the driving signals generate noise ripples on the panel. In the following example, descriptions are made by using the 1-to-2 demultiplexer 102 as an example first. That is, control signals of the demultiplexer 102 include a first control signal M1 and a second control signal M2.

Figure 3A:
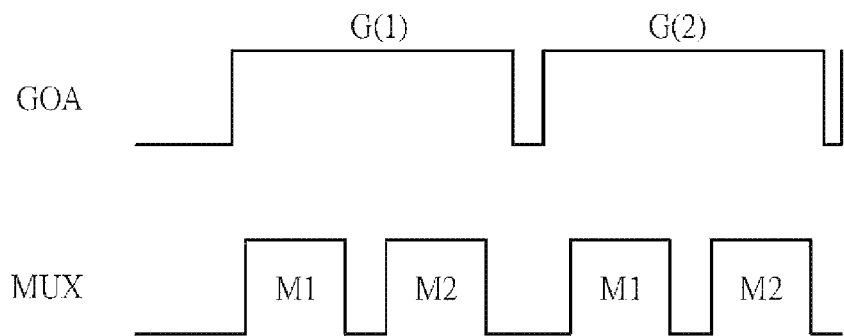
FIG. 3A is a schematic diagram of effects of a clock signal and a control signal on noise in an example.

FIG. 3A is a timing diagram of a clock signal, a control signal and noise. In a waveform shown in FIG. 3A, waveforms of gate driving signals G(1) and G(2) are integrated and shown as a GOA waveform, and the first control signal M1 and the second control signal M2 are integrated and shown as a MUX waveform. As shown in FIG. 3A, when the gate driving signal G(1) is enabled, the first control signal M1 and the second control signal M2 are alternately enabled. Then, when the gate driving signal G(2) is enabled, the first control signal M1 and the second control signal M2 are alternately enabled. In this embodiment, it can be seen from the MUX waveform that signal rising edges and signal falling edges are alternated many times, causing that more panel noises.

Figure 3B:
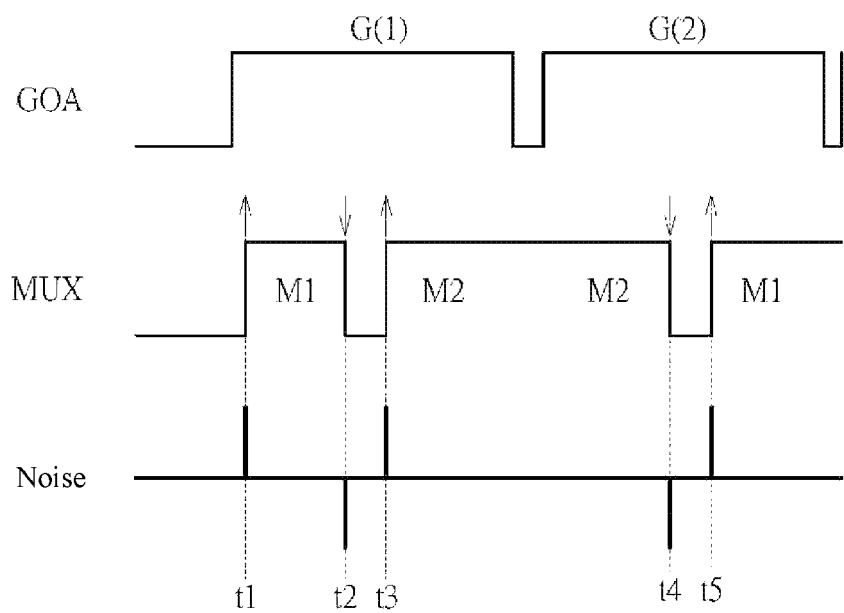
FIG. 3B is a schematic diagram of effects of a clock signal and a control signal on noise in another example.

FIG. 3B is a timing diagram of another example of a clock signal, a control signal and noise. In this example, when a gate driving signal G(1) is enabled, a first control signal M1 is enabled first, and then, a second control signal M2 is enabled. Then, the second control signal M2 is kept enabled, and a gate driving signal G(2) is enabled is equivalent to first enabling the second control signal M2 and then enabling the first control signal M1. A quantity of disturbances, compared with that in FIG. 3A, is reduced in a MUX waveform in FIG. 3B. A corresponding noise waveform is shown on a lower part of FIG. 3B. There are five relatively apparent noise pulses, respectively at time points t1, t2, t3, t4, and t5. In the accompanying drawings of this specification, an upward arrow and a downward arrow respectively represent a rising edge and a falling edge of a signal.

Figure 4:
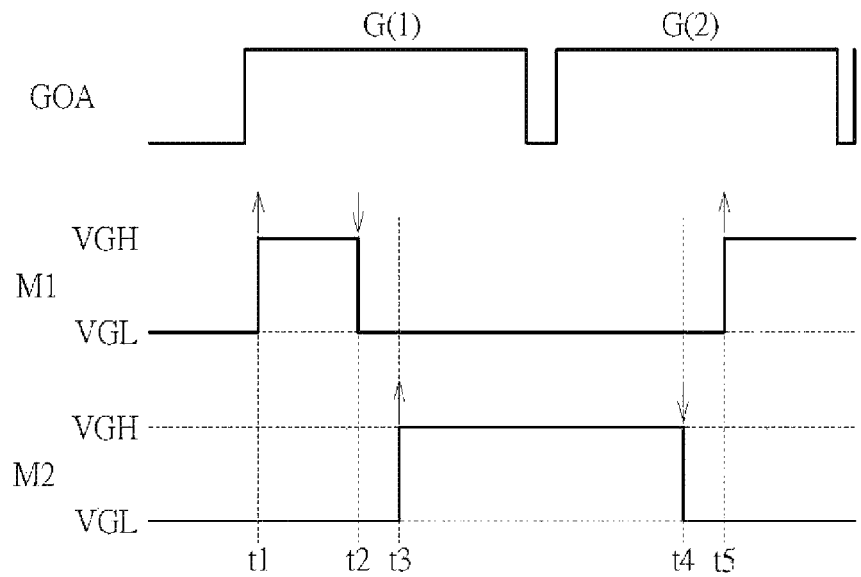
FIG. 4 is a waveform graph of an example in which there are two control signals.

FIG. 4 is a timing diagram of an embodiment in which there are two control signals. In this example, signal waveforms of a first control signal M1 and a second control signal M2 are respectively illustrated corresponding to driving manners in FIG. 3B. It can be seen from the waveforms in FIG. 4 that when a voltage of the first control signal M1 changes, a voltage of the second control signal M2 is kept unchanged, and when the voltage of the second control signal M2 changes, the voltage of the first control signal M1 is kept unchanged. In this way, as shown in FIG. 3B, apparent noise pulses are generated.

This disclosure provides a driving method for a display panel, in which a voltage change of a second control signal M2 compensates for a voltage change of a first control signal M1. For example, the driving method may be applied to a driving control circuit 140 shown in FIG. 1, to provide the first control signal M1 and the second control signal M2 to a demultiplexer 102.

A voltage change may be compensated for various manners. The following are exemplary descriptions, and are not intended to limit the present invention. For example, when a voltage of the first control signal M1 changes, a voltage of the second control signal M2 reversely changes, to compensate noise caused by the voltage change of the first control signal M1, thereby reducing noise sensed on the panel. In an embodiment, noise may be caused by a relatively sharp or rapid voltage change. For example, a change of a voltage is relatively apparent in a short time, and tends to occur on a rising edge and a falling edge of a square wave signal. Therefore, an exemplary manner of compensating for a voltage change is aligning a time point of a rising edge of the first control signal M1 with a time point of a falling edge of the second control signal M2 and/or aligning a time point of a falling edge of the first control signal M1 with a time point of a rising edge of the second control signal M2. In the following descriptions, different manners of compensating for a voltage change are described by using various embodiments and drawings.

Figure 5:
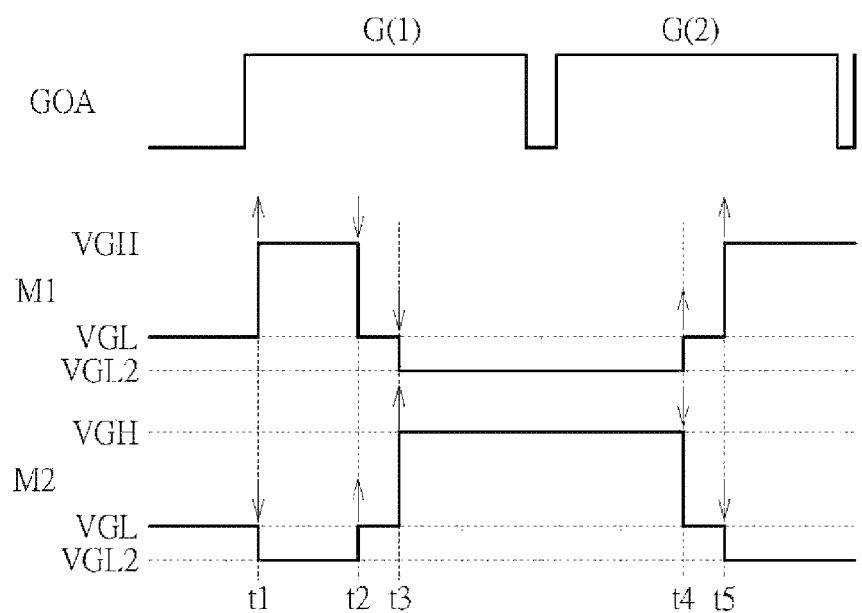
FIG. 5 is a control signal waveform graph according to an embodiment of the present invention.

FIG. 5 is a control signal timing diagram according to an embodiment of the present invention. At a time point t1, a falling edge of a second control signal M2 is essentially aligned with a rising edge of a first control signal M1. A voltage change of the second control signal M2 is reverse to a voltage change of the first control signal M1. Therefore, at the time point t1, noise energy can be reduced. At a time point t2, a rising edge of the second control signal M2 is essentially aligned with a falling edge of the first control signal M1. Therefore, at the time point t2, noise energy can also be reduced.

An exemplary circuit is that: when a voltage of the first control signal M1 increases from a first low gate voltage level VGL to a high gate voltage level VGH (at the time point t1), a voltage of the second control signal M2 decreases from the first low gate voltage level VGL to a second low gate voltage level VGL2; and when the voltage of first control signal M1 decreases from the high gate voltage level VGH to the first low gate voltage level VGL (at the time point t2), the voltage of the second control signal M2 increases from the second low gate voltage level VGL2 to the first low gate voltage level VGL.

The high gate voltage level VGH is a voltage (for example, is 20 V) that can turn on thin film transistors (TFTs) in the demultiplexer 102; the low gate voltage level VGL is a voltage (for example, is −8 V) that can turn off the thin film transistors (TFTs) in the demultiplexer 102; and the second low gate voltage level VGL2 (for example, is −16 V) is lower than the low gate voltage level VGL, can also turn off the TFTs in the demultiplexer 102. The voltage herein are provided by way of example only, and are not intended to limit the present invention.

As shown in FIG. 5, at the time point t1 and the time point t2, the voltage change of the second control signal M2 compensates the voltage change of the first control signal M1, thereby effectively compensating noise energy generated by the first control signal M1. Therefore, at the time point t1 and the time point t2, panel noise can be reduced. Moreover, because when the voltage of the second control signal M2 decreases to the second low gate voltage level VGL2, the TFTs in the demultiplexer 102 may still be kept in turn off state, an operation of driving pixel data will not be affected.

In an embodiment, the driving method may further include: the voltage change of the first control signal M1 compensating for the voltage change of the second control signal M2. As shown in FIG. 5, at a time point t3, a falling edge of the first control signal M1 is essentially aligned with a rising edge of the second control signal M2. When the voltage of the second control signal M2 increases from the first low gate voltage level VGL to the high gate voltage level VGH, the voltage of the first control signal M1 decreases from the first low gate voltage level VGL to the second low gate voltage level VGL2. At a time point t4, a rising edge of the first control signal M1 is essentially aligned with a falling edge of the second control signal M2. When the voltage of the second control signal M2 decreases from the high gate voltage level VGH to the first low gate voltage level VGL, the voltage of the first control signal M1 increases from the second low gate voltage level VGL2 to the first low gate voltage level VGL. As stated above, at the time point t3 and the time point t4, the voltage change of the first control signal M1 compensates for the voltage change of the second control signal M2, thereby effectively compensating noise energy generated by the second control signal M2. Therefore, at the time point t3 and the time point t4, panel noise can be reduced.

A case at a time point t5 is similar to that at the time point t1, and details are not described herein again. In the example shown in FIG. 5, although voltage change compensation is performed at all of the time points t1, t2, t3, t4, and t5, during implementation, voltage change compensation may be performed at at least one of the time point t1, t2, t3, t4, and t5, so as to reduce panel noise. The compensation does not need to be performed at each time point.

Figure 6:
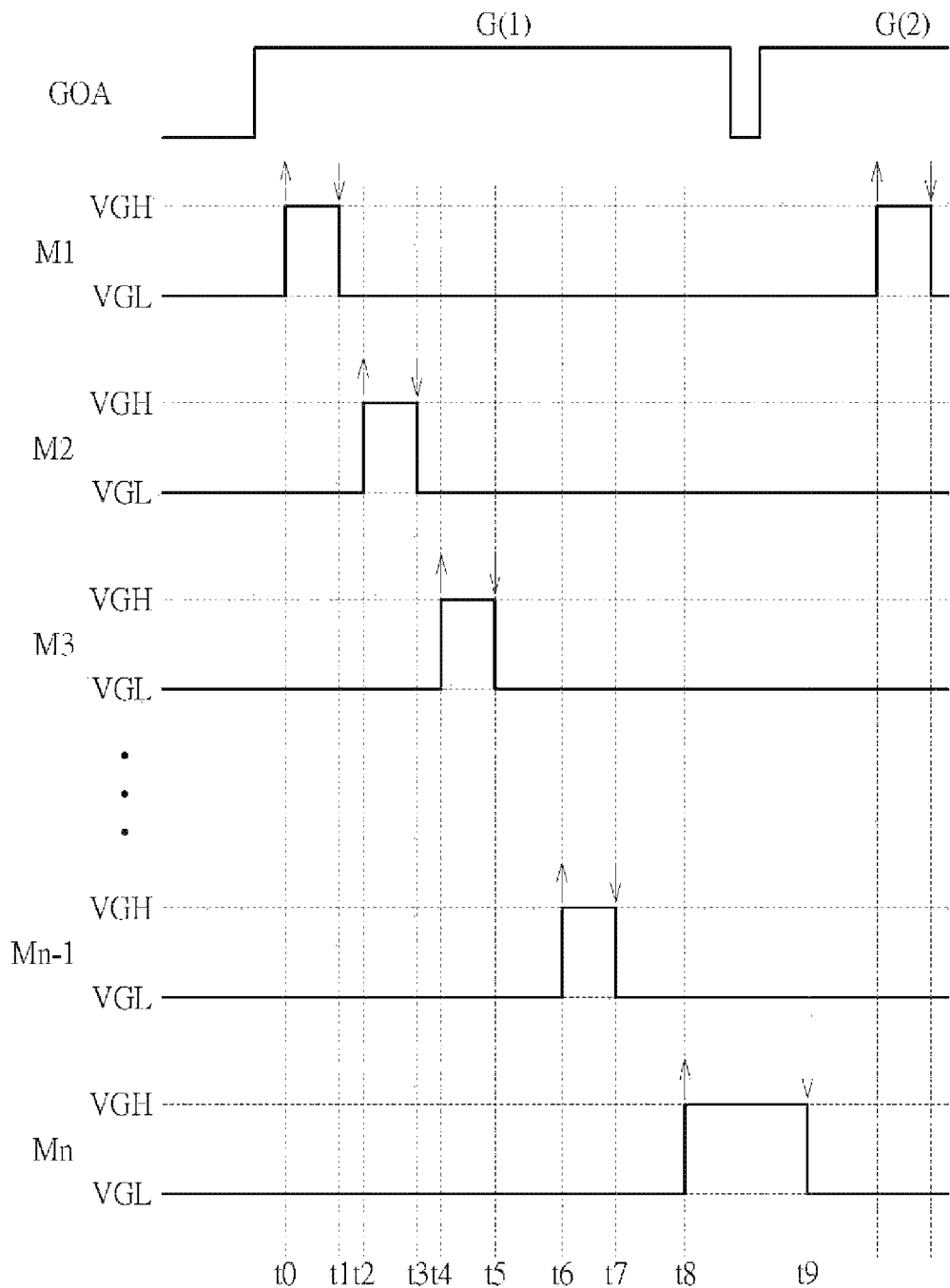
FIG. 6 is a signal waveform graph of an example in which there are multiple control signals.

The waveform example shown in FIG. 5 corresponds to using 1-to-2 demultiplexer, for example, the display panel shown in FIG. 2A. The driving method in the present invention may also be applied to a 1-to-n demultiplexer, where n is a positive integer greater than 2. FIG. 6 is a signal waveform graph of an example in which there are multiple control signals. FIG. 6 shows a driving signal waveform corresponding to a case in which a voltage compensation mechanism is not added. When a gate driving signal G(1) is enabled, the first control signal M1, the second control signal M2, ..., and an $n^{th}$ control signal Mn are enabled in order; subsequently, the $n^{th}$ control signal Mn is kept enabled, and then when a gate driving signal G(2) is enabled, the first control signal M1 and the second control signal M2 are enabled in order.

Figure 7:
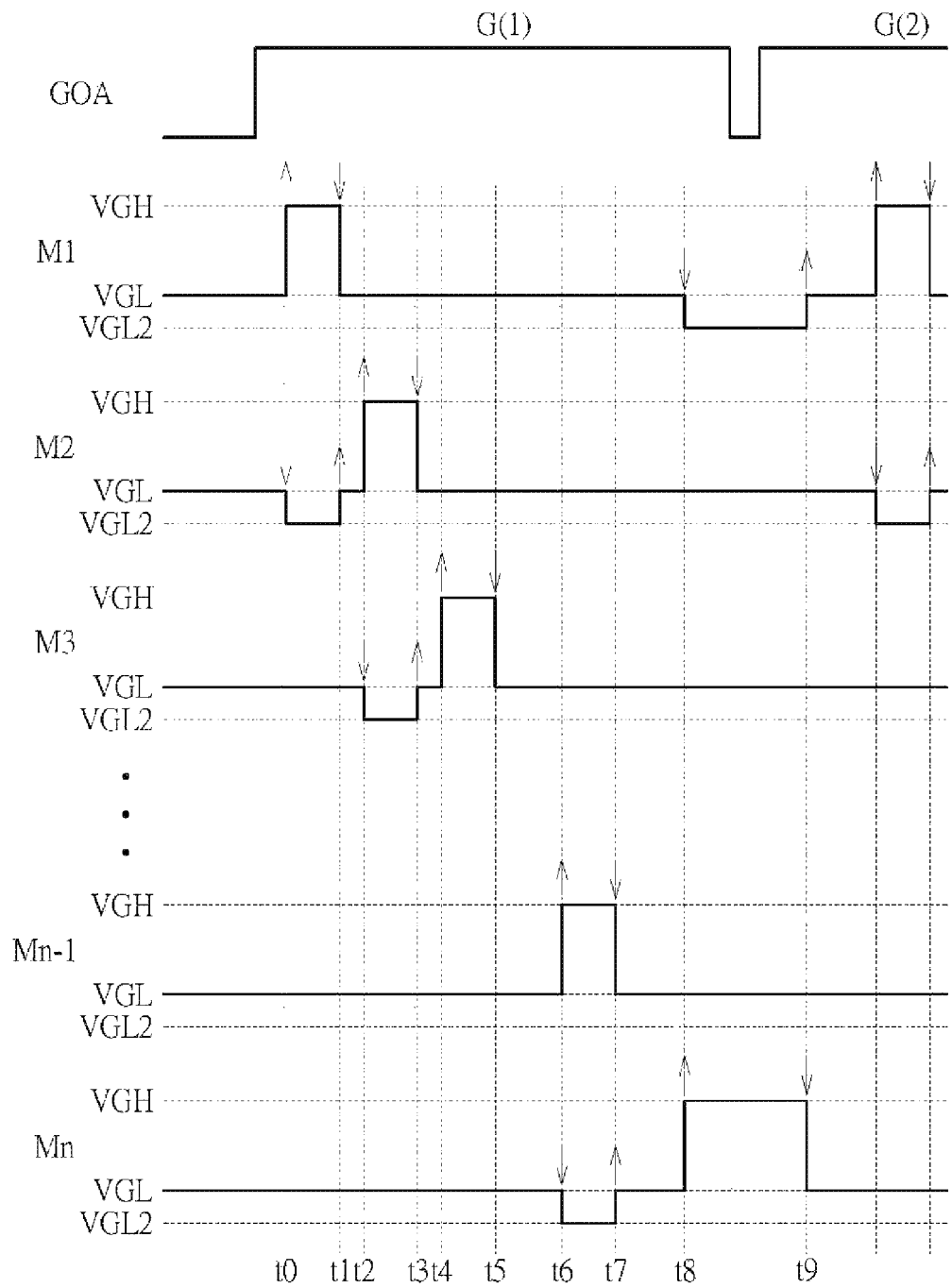
FIG. 7 is a control signal waveform graph according to an embodiment of the present invention.

FIG. 7 is a control signal waveform graph according to an embodiment of the present invention. FIG. 7 corresponds to FIG. 6 added with a voltage compensation mechanism. In an embodiment in which there are n control signals, a voltage change of an $(i+1)^{th}$ control signal compensates for a voltage change of an $(i)^{th}$ control signal, and a voltage change of a first control signal compensates for a voltage change of an $n^{th}$ control signal, where i is a positive integer. For example, the driving method may include: a voltage change of a second control signal M2 compensating for a voltage change of a first control signal M1; a voltage change of a third control signal M3 compensating for the voltage change of the second control signal M2; a voltage change of an $n^{th}$ control signal Mn compensating for a voltage change of an $(n-1)^{th}$ control signal Mn-1; and the voltage change of the first control signal M1 compensating for the voltage change of the $n^{th}$ control signal Mn.

As shown in FIG. 7, at time points t0 and t1, the voltage change of the second control signal M2 can compensate for the voltage change of the first control signal M1. At time points t2 and t3, the voltage change of the third control signal M3 can compensate for the voltage change of the second control signal M2. At time points t6 and t7, the voltage change of the $n^{th}$ control signal Mn can compensate for the voltage change of the $(n-1)^{th}$ control signal Mn-1. At time points t8 and t9, the voltage change of the first control signal M1 compensates for the voltage change of the $n^{th}$ control signal Mn. For example, when the $n^{th}$ control signal Mn is shifted to the high gate voltage level VGH, the first control signal M1 is shifted to the second low gate voltage level VGL2. In the example shown in FIG. 7, the driving method in the present invention may be applied to any 1-to-n demultiplexer, and can effectively reduce panel noise.

In an embodiment, in addition to the voltage change of the second control signal M2 compensating for the voltage change of the first control signal M1 and the voltage change of the third control signal M3 compensating for the voltage change of the second control signal M2, the method may further include: the voltage change of the first control signal M1 compensating for the voltage change of the second control signal M2 and the voltage change of the second control signal M2 compensating for the voltage change of the second control signal M3. The following clearly describes the method by using a 1-to-3 demultiplexer as an example.

Figure 8:
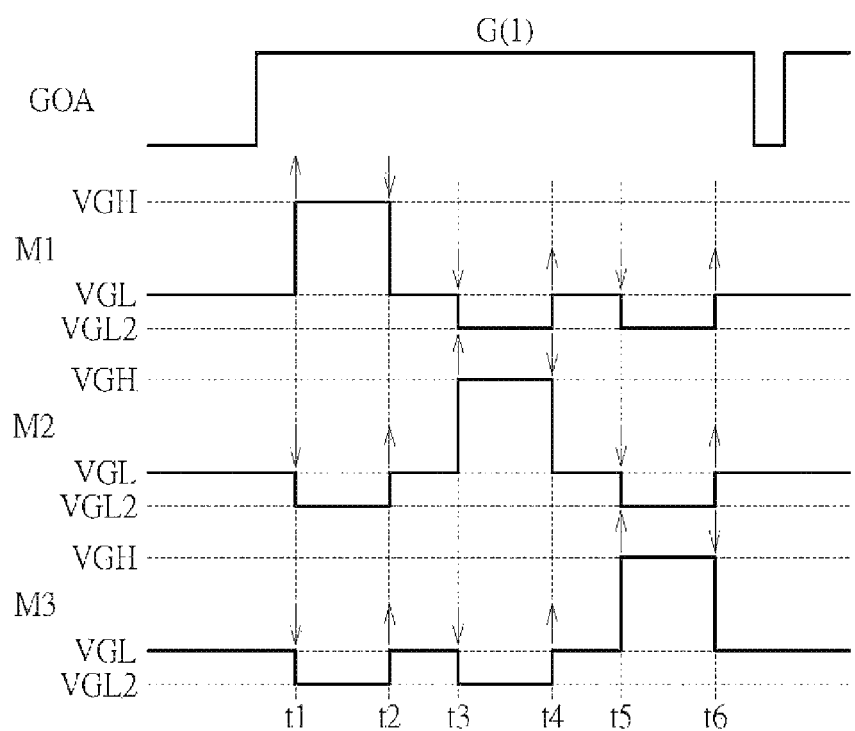
FIG. 8 is a control signal waveform graph according to an embodiment of the present invention.

FIG. 8 is a control signal waveform graph according to an embodiment of the present invention. In this example, a 1-to-3 demultiplexer, for example, the display panel shown in FIG. 2B is used. At a time point t3, a falling edge of a first control signal M1 is essentially aligned with a rising edge of a second control signal M2, and a falling edge of a third control signal M3 is essentially aligned with the rising edge of the second control signal. At a time point t4, a rising edge of the first control signal M1 is essentially aligned with a falling edge of the second control signal M2, and a rising edge of the third control signal M3 is essentially aligned with the falling edge of the second control signal M2. That is, the first control signal M1 and the third control signal M3 both compensate for a noise effect caused by the second control signal M2, thereby further reducing noise energy. Similarly, the second control signal M2 and the third control signal M3 can both compensate for a noise effect caused by the first control signal M1 (at a time point t1 and a time point t2); and the first control signal M1 and the second control signal M2 can both compensate for a noise effect caused by the third control signal M3 (at a time point t5 and a time point t6).

In an example implemented as circuit, when a voltage of the second control signal M2 increases from a first low gate voltage level VGL to a high gate voltage level VGH (at the time point t3), a voltage of the first control signal M1 decreases from the first low gate voltage level VGL to a second low gate voltage level VGL2, and a voltage of the third control signal M3 decreases from the first low gate voltage level VGL to the second low gate voltage level VGL2. When the voltage of the second control signal M2 decreases from the high gate voltage level VGH to the first low gate voltage level VGL (at the time point t4), the voltage of the first control signal M1 increases from the second low gate voltage level VGL2 to the first low gate voltage level VGL, and the voltage of the third control signal M3 increases from the second low gate voltage level VGL2 to the first low gate voltage level VGL.

In this embodiment, by means of compensation from both an upper-level control signal and a lower-level control signal, noise energy can be further reduced. In the example illustrated in FIG. 8, voltage change compensation is performed at all of the time points t1, t2, t3, t4, t5, and t6. During implementation, voltage change compensation may be performed at at least one of the time point t1, t2, t3, t4, t5, and t6, so as to reduce panel noise. The compensation does not need to be performed at each time point.

In an embodiment, the compensation from both an upper-level control signal and a lower-level control signal shown in FIG. 8 may be applied to the n control signals shown in FIG. 6 and FIG. 7. For example, the voltage change of the second control signal M2 compensates for the voltage change of the first control signal M1, and a voltage change of an $n^{th}$ control signal Mn compensates for the voltage change of the first control signal M1; and the voltage change of the third control signal M3 compensates for the voltage change of the second control signal M2, and the voltage change of the first control signal M1 compensates for the voltage change of the second control signal M2.

Figure 9:
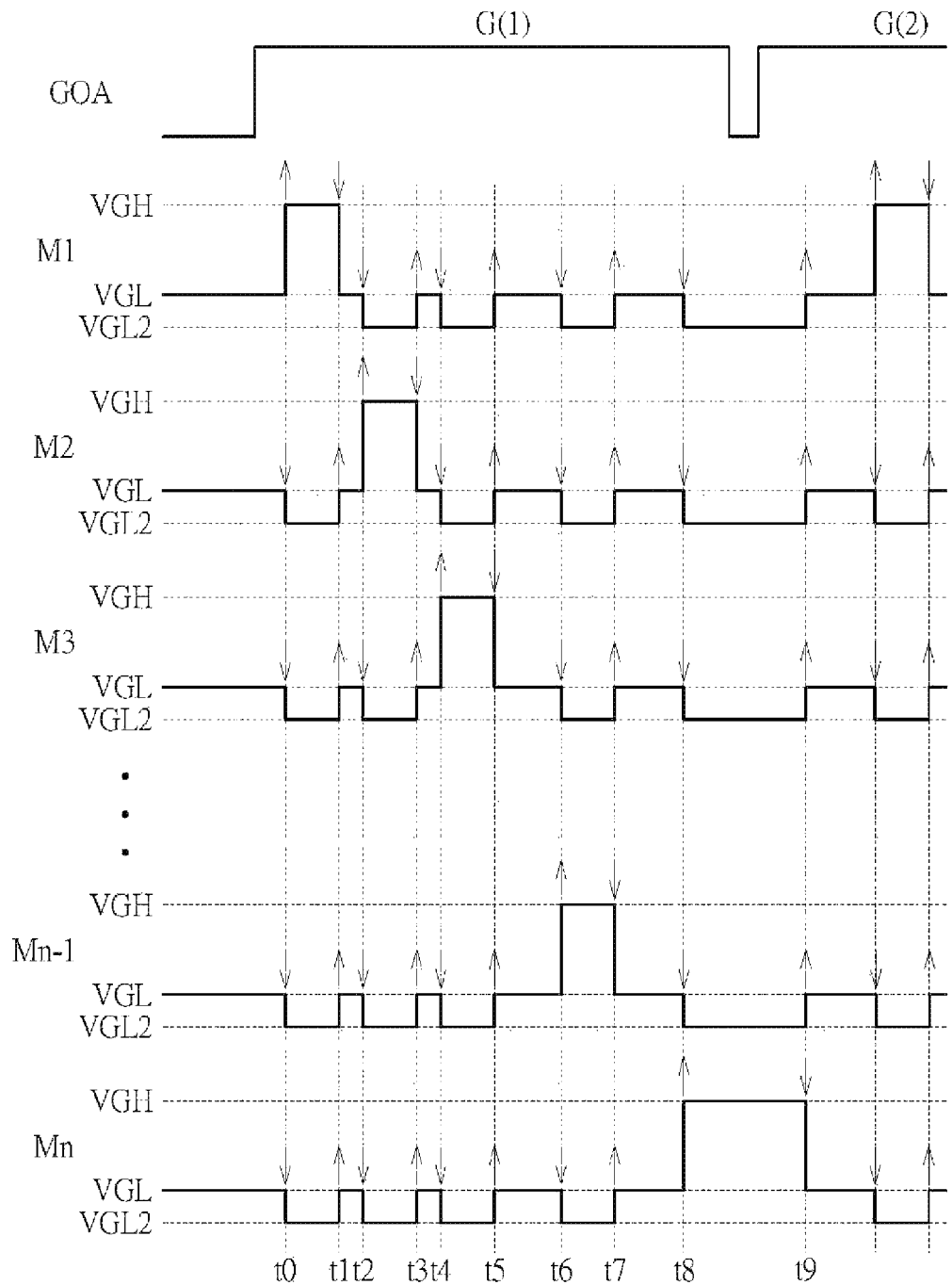
FIG. 9 is a control signal waveform graph according to an embodiment of the present invention.

In another embodiment, voltage changes of all the other control signals may compensate for a voltage change of one control signal. FIG. 9 is a control signal waveform graph according to an embodiment of the present invention. As shown in FIG. 9, at time points t0 and t1, voltage changes of a second control signal M2 to an $n^{th}$ control signal Mn may both be used to compensate for a voltage change of a first control signal M1; at time points t2 and t3, the voltage change of the first control signal M1, and voltage changes of a third control signal M3 to the $n^{th}$ control signal Mn may all be used to compensate for the voltage change of the second control signal M2; and at time points t8 and t9, voltage changes of the first control signal M1 to an $(n-1)^{th}$ control signal Mn-1 may all be used to compensate for the voltage change of the $n^{th}$ control signal Mn.

In the foregoing multiple embodiments, by means of voltage change compensation of control signals, panel noise can be reduced. In another embodiment, the driving method in the present invention may further include: providing a first clock signal to a gate driving signal G(1), and providing a second clock signal to a gate driving signal G(2), where a voltage change of the first clock signal compensates for a voltage change of the second clock signal. That is, panel noise may be reduced by means of voltage change compensation of the gate driving signals. The driving method can also be implemented by using the driving control circuit 140 shown in FIG. 1.

Figure 10:
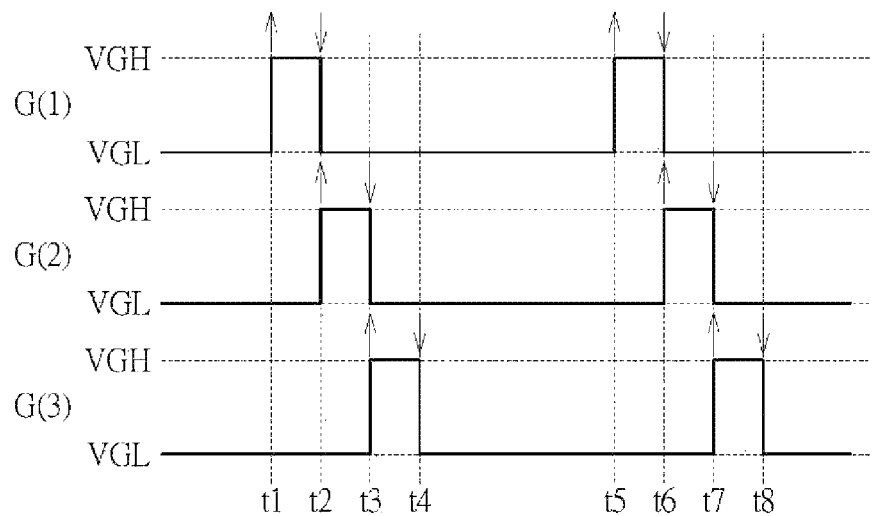
FIG. 10 is a clock signal waveform graph according to an embodiment of the present invention.

FIG. 10 is a clock signal waveform graph according to an embodiment of the present invention. Gate driving signals G(1), G(2), and G(3) may respectively correspond to different rows of a display panel. Refer to the panel structure shown in FIG. 2A and FIG. 2B. The driving control circuit 140 may control the output gate driving signals G(1), G(2), and G(3), as shown in FIG. 10, to achieve voltage change compensation. For example, at a time point t2, a falling edge of the gate driving signal G(1) is essentially aligned with a rising edge of the gate driving signal G(2), and at a time point t3, a falling edge of the gate driving signal G(2) is essentially aligned with a rising edge of the gate driving signal G(3).

An example of a circuit implementation may be that: when a voltage of the gate driving signal G(1) decreases from a high gate voltage level VGH to a first low gate voltage level VGL, a voltage of the gate driving signal G(2) increases from the first low gate voltage level VGL to the high gate voltage level VGH (at the time point t2); when the voltage of the gate driving signal G(2) decreases from the high gate voltage level VGH to the first low gate voltage level VGL, a voltage of the gate driving signal G(3) increases from the first low gate voltage level VGL to the high gate voltage level VGH (at the time point t3). In this way, not only panel noise generated by the demultiplexer 102 can be reduced, but also panel noise generated by the gate on array 101 can be reduced.

The driving control circuit 140 shown in FIG. 1 may be configured to provide the clock signal shown in FIG. 10 to the gate on array 101, and may be configured to provide the control signals in FIG. 5 to FIG. 9 to the demultiplexer 102. For example, the driving control circuit 140 may include a voltage level shifter, configured to shift a timing control signal from the timing controller 120 to proper voltages of driving signals needed by the GOA 101 and the demultiplexer 102.

According to the foregoing multiple embodiments of the present invention, by means of mutual compensation for voltage changes of multiple control signals, and/or mutual compensation for voltage changes of multiple gate driving signals, noise generated on the display panel can be reduced, so that a touch function is not affected.

In the foregoing embodiments, the high gate voltage level VGH is used as a control voltage for switching on a transistor, and the low gate voltage level VGL is used as a control voltage for switching off a transistor. However, no limitation is imposed in the present invention. If low-voltage-enabled switch elements (such as a PMOS transistor) are used, the method in the foregoing multiple embodiments can also be used. For example, voltage polarity in the foregoing multiple embodiments may be changed. Details are not described herein again.

Figure 11:
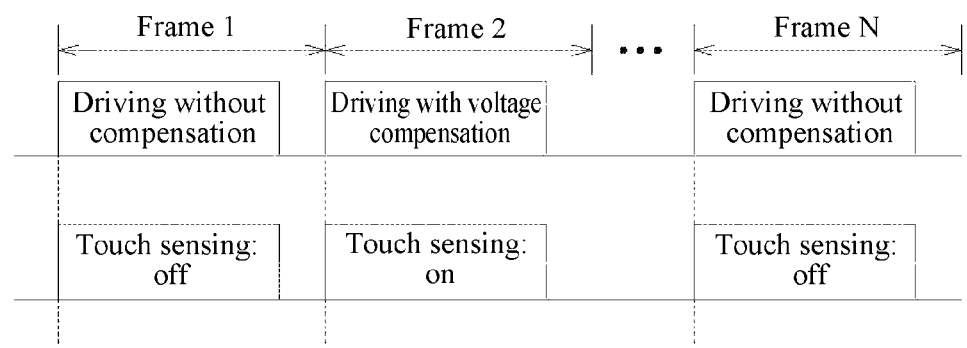
FIG. 11 is a schematic diagram of switching an operation mode according to an embodiment of the present invention.

In an embodiment, whether to enable the driving method including voltage compensation disclosed in the present invention is determined according to a frame that is used as a unit. FIG. 11 is a schematic diagram of switching an operation mode according to an embodiment of the present invention. In a frame 1, when a touch sensing function is not enabled, because panel noise at this moment does not affect touch control, a driving method without voltage compensation may be used, to reduce power consumption. In a frame 2, when the touch sensing function is enabled, the driving method including voltage compensation disclosed in the present invention may be used, to reduce noise generated during a process of driving pixel data, so as to ensure that touch sensing can be normally performed. The driving method including voltage compensation is enabled only when there is a frame in which touch sensing needs to be performed, thereby saving power and extending a service time of an apparatus.

To sum up, although the present invention is disclosed as above by using the embodiments, the embodiments are not intended to limit the present invention. Persons skilled in the art may make various variations and modifications without departing from the spirit and scope of the present invention. Therefore, the protection scope of the present invention shall be subject to the appended claims.

What is claimed is:

1. A driving method for a display panel, comprising:
providing a first control signal during a first time frame; and
providing a second control signal during said first time frame;
wherein the first control signal fluctuates with a first voltage change, the second control signal fluctuates with a second voltage change, said second voltage change is less than said first voltage change, and the second voltage change compensates for the first voltage change during said first time frame.

2. The driving method according to claim 1, wherein the first voltage change also compensates the second voltage change.

3. The driving method according to claim 1, wherein a falling edge of the second control signal aligns with a rising edge of the first control signal.

4. The driving method according to claim 1, wherein a rising edge of the second control signal aligns with a falling edge of the first control signal.

5. The driving method according to claim 1, wherein when the first control signal increases from a first low gate voltage level to a high gate voltage level, the second control signal decreases from the first low gate voltage level to a second low gate voltage level to compensate for the first voltage change.

6. The driving method according to claim 1, wherein when the first control signal decreases from a high gate voltage level to a first low gate voltage level, the second control signal increases from a second low gate voltage level to the first low gate voltage level to compensate for the first control signal.

7. The driving method according to claim 1, wherein the driving method further comprises:
   providing a third control signal during said first time frame;
   wherein the third control signal fluctuates with a third voltage change, and the third voltage change compensates for the first voltage change during said first time frame, and compensates for the second voltage change during a second time frame.

8. The driving method according to claim 1, wherein the second voltage change compensates for the third voltage change during a third time frame.

9. The driving method according to claim 8, wherein a falling edge of the first control signal aligns with a rising edge of the second control signal when said first time frame ends, and a falling edge of the third control signal aligns with the rising edge of the second control signal when said third time frame ends.

10. The driving method according to claim 8, wherein a rising edge of the first control signal aligns with a falling edge of the second control signal when said first time frame starts, and a rising edge of the third control signal aligns with the falling edge of the second control signal when said third time frame starts.

11. A driving method for a display panel, comprising:
   providing a first control signal during a time frame; and
   providing a second control signal during said time frame;
   wherein when the second control signal has a second voltage change by increasing from a first low gate voltage level to a high gate voltage level, the first control signal has a first voltage change by decreasing from the first low gate voltage level to a second low gate voltage level to compensate the second control signal during said time frame, and the first voltage change is less than the second voltage change.

12. A driving method for a display panel, comprising:
   providing a first control signal, wherein the first control signal fluctuates with a first voltage change;
   providing a second control signal, wherein the second control signal fluctuates with a second voltage change, and the second voltage change compensates for the first voltage change;
   providing a third control signal, wherein the third control signal fluctuates with a third voltage change, and the third voltage change compensates for the second voltage change;
   wherein the second voltage change also compensates for the third voltage change; and
   wherein when the second control signal decreases from a high gate voltage level to a first low gate voltage level, the first control signal increases from a second low gate voltage level to the first low gate voltage level, and the third control signal increases from the second low gate voltage level to the first low gate voltage level.

13. The driving method according to claim 1, wherein the driving method further comprises:
   providing a first clock signal; and
   providing a second clock signal;
   wherein the first clock signal fluctuates with a first clock voltage change, the second clock signal fluctuates with a second clock voltage change, and the first clock voltage change compensates for the second clock voltage change.

14. The driving method according to claim 13, wherein a falling edge of the first clock signal aligns with a rising edge of the second clock signal.

15. The driving method according to claim 13, wherein when the first clock signal decreases from a high gate voltage level to a first low gate voltage level, a voltage of the second clock signal increases from the first low gate voltage level to the high gate voltage level.

16. The driving method according to claim 1, wherein the first voltage change is in a positive polarity, the second voltage change is in a negative polarity.

17. The driving method according to claim 1, wherein said second voltage change is zero when a touch sensing function is disabled.

* * * * *